United States Patent
Barthelemy et al.

(10) Patent No.: US 11,332,837 B2
(45) Date of Patent: May 17, 2022

(54) ELECTRODE MATERIAL AND USE THEREOF FOR THE MANUFACTURE OF AN INERT ANODE

(71) Applicant: ELYSIS LIMITED PARTNERSHIP, Montreal (CA)

(72) Inventors: Christian Barthelemy, Voiron (FR); Sylvie Bouvet, Vinay (FR); Armand Gabriel, Le Fontanil-Cornillon (FR); Veronique Laurent, Saint Egreve (FR); Ariane Marmottant, Charnecles (FR)

(73) Assignee: ELYSIS LIMITED PARTNERSHIP, Montreal (CA)

( * ) Notice: Subject to any disclaimer, the term of this patent is extended or adjusted under 35 U.S.C. 154(b) by 0 days.

(21) Appl. No.: 15/321,795

(22) PCT Filed: Jun. 23, 2015

(86) PCT No.: PCT/IB2015/001041
§ 371 (c)(1),
(2) Date: Dec. 23, 2016

(87) PCT Pub. No.: WO2015/198128
PCT Pub. Date: Dec. 30, 2015

(65) Prior Publication Data
US 2017/0130351 A1    May 11, 2017

(30) Foreign Application Priority Data
Jun. 26, 2014   (FR) ........................................ 1401435

(51) Int. Cl.
*C25C 3/12* (2006.01)
*C25C 7/02* (2006.01)
(Continued)

(52) U.S. Cl.
CPC .................. *C25C 3/12* (2013.01); *B22F 3/16* (2013.01); *B22F 7/008* (2013.01); *B22F 7/02* (2013.01);
(Continued)

(58) Field of Classification Search
CPC .... C25C 7/02–7/025; C25C 3/12; C25C 3/08; B22F 3/16; B22F 7/008; B22F 7/04;
(Continued)

(56) References Cited

U.S. PATENT DOCUMENTS 4,872,438 A    10/1989   Ausiello et al.
6,372,099 B1    4/2002   Duruz et al.
(Continued)

FOREIGN PATENT DOCUMENTS

AU         2004222545 A1     9/2004
WO         01/31090 A1       5/2001
(Continued)

OTHER PUBLICATIONS

Pawlek ("Inert Anodes: An Update", Light Metals, 2002, pp. 1126-1133 (Year: 2002).*
(Continued)

*Primary Examiner* — Alexander W Keeling
(74) *Attorney, Agent, or Firm* — Banner & Witcoff, Ltd.

(57) ABSTRACT

The invention relates to an electrode material, preferably an inert anode material comprising at least a metal core and a cermet material, characterized in that:
  said metal core contains at least one nickel (Ni) and iron (Fe) alloy,
  said cermet material comprises at least as percentages by weight:
    45 to 80% of a nickel ferrite oxide phase (2) of composition $Ni_xFe_yM_zO_4$ with $0.60 \leq x \leq 0.90$; $1.90 \leq y \leq 2.40$; $0.00 \leq z \leq 0.20$ and M being a metal
(Continued)

selected from aluminum (Al), cobalt (Co), chromium (Cr), manganese (Mn), titanium (Ti), zirconium (Zr), tin (Sn), vanadium (V), niobium (Nb), tantalum (Ta) and hafnium (Hf) or being a combination of these metals, 15 to 45% of a metallic phase (1) comprising at least one alloy of nickel and copper.

25 Claims, 1 Drawing Sheet

(51) Int. Cl.
| | | |
|---|---|---|
| C22C 29/12 | (2006.01) | |
| B22F 7/04 | (2006.01) | |
| C22C 29/00 | (2006.01) | |
| C22C 1/10 | (2006.01) | |
| B22F 7/02 | (2006.01) | |
| B22F 3/16 | (2006.01) | |
| B22F 7/00 | (2006.01) | |
| C22C 19/00 | (2006.01) | |
| C22C 19/03 | (2006.01) | |
| C25C 7/00 | (2006.01) | |
| C04B 35/26 | (2006.01) | |
| C04B 35/626 | (2006.01) | |

(52) U.S. Cl.
CPC ............ *B22F 7/04* (2013.01); *C04B 35/2666* (2013.01); *C04B 35/62675* (2013.01); *C22C 1/1084* (2013.01); *C22C 19/002* (2013.01); *C22C 19/03* (2013.01); *C22C 29/005* (2013.01); *C22C 29/12* (2013.01); *C25C 7/005* (2013.01); *C25C 7/025* (2013.01); *B22F 2301/15* (2013.01); *B22F 2302/25* (2013.01); *B22F 2998/10* (2013.01); *C04B 2235/3222* (2013.01); *C04B 2235/3225* (2013.01); *C04B 2235/3274* (2013.01); *C04B 2235/3279* (2013.01); *C22C 2204/00* (2013.01)

(58) Field of Classification Search
CPC .......... C04B 35/2666; C04B 35/62675; C22C 19/002; C22C 19/03; C22C 29/12
See application file for complete search history.

(56) References Cited

U.S. PATENT DOCUMENTS

| | | | |
|---|---|---|---|
| 6,372,119 B1 | 4/2002 | Ray et al. | |
| 2004/0216995 A1* | 11/2004 | Nguyen | ............... C25C 3/12 |
| | | | 204/243.1 |
| 2005/0194066 A1* | 9/2005 | Duruz | .................. C25C 3/12 |
| | | | 148/241 |
| 2007/0056848 A1 | 3/2007 | Tailhades et al. | |
| 2011/0192728 A1 | 8/2011 | Nguyen | |

FOREIGN PATENT DOCUMENTS

| | | | | |
|---|---|---|---|---|
| WO | WO-0131090 A1 * | 5/2001 | ............. | B22F 1/025 |
| WO | 01/42534 A2 | 6/2001 | | |
| WO | 02/066710 A1 | 8/2002 | | |
| WO | 2004/082355 A2 | 9/2004 | | |

OTHER PUBLICATIONS

Hanbing ("The Metal Phase Selection of 10NiO—NiFe2O4-Based Cermet Anodes for Aluminum Electrolysis", Light Metals, 2014, pp. 1321-1325) (Year: 2014).*
Oct. 20, 2015—International Search Report and Written Opinion of PCT/IB2015/001041.

* cited by examiner

ELECTRODE MATERIAL AND USE THEREOF FOR THE MANUFACTURE OF AN INERT ANODE

CROSS-REFERENCE TO RELATED APPLICATIONS

This application is a U.S. National Stage application under 35 U.S.C. § 371 of International Application PCT/IB2015/001041 (published as WO 2015/198128 A1), filed Jun. 23, 2015, which claims priority to French Patent Application No. 1401435, filed Jun. 26, 2014, and the present application claims priority to and the benefit of both of these prior applications, each of which is incorporated by reference in its entirety.

TECHNICAL FIELD

The invention relates to electrode materials, and more particularly to anodes intended for the production of aluminum by electrolysis. It relates more precisely to anodes known as "inert" or "non-consumable" and their preparation and use.

The following description refers more specifically to the use of the electrode material that is the subject of the present invention as an inert anode for the production of aluminum from a igneous electrolysis process. However, mentioning this industrial application in the description does not in any way limit the scope of the invention. The present invention may relate to other industrial applications of the electrode material described below.

BACKGROUND

Metallic aluminum is produced industrially by igneous electrolysis, namely by electrolytic reduction of alumina in solution in a molten cryolite bath, known as an electrolytic bath, using the Hall-Héroult process. Electrolytic reduction is carried out in electrolytic cells comprising an electrolytic pot provided with carbon cathode elements, and one or more anodes. The electrolytic bath is contained in the cell and the anodes are partially immersed in the electrolytic bath. The electrolysis current helps maintain the electrolytic bath at the required temperature by the Joule effect. The electrolytic cell is fed regularly with alumina so as to compensate for the alumina consumed by the electrolytic reaction.

In standard technology, anodes are made of carbonaceous material and the electrolysis is conducted at a temperature typically of the order of 950° C. As anodes made of carbonaceous material are progressively consumed during electrolysis, the height of the part of the anodes which is immersed in the bath must be adjusted continuously and work must be carried out on the cell to replace the anodes.

In addition, the consumption of anodes:
produces carbon dioxide (more than two tonnes of carbon dioxide per tonne of aluminum produced), which contributes to the greenhouse effect, and
releases sulfur dioxide due to the presence of sulfur in the raw materials used to manufacture of the anode.

The development of an alumina electrolysis technology using 'inert' or "non-consumable" anodes seeking to resolve these disadvantages inevitably runs up against the difficulty of making anodes that meet different and antagonistic quality criteria.

The anodes must be sufficiently conductive at the operating temperature so as not to inordinately increase the consumption of electrical energy related to this technology.

Moreover, the anodes must resist corrosion in aggressive cryolite baths so as to have a sufficiently long service life and so as to prevent contamination of the electrolyte and the aluminum by undesirable elements.

Finally it must be possible to manipulate the anodes. This requires certain mechanical properties: fragile anodes would be unusable in industrial processes.

To meet the above criteria, namely conductivity, corrosion resistance and durability, it was proposed to use monolithic ceramic components to manufacture these inert anodes.

For example, patent applications WO02/066710, WO02/083992 and US2004/089558 describe various compositions of oxides which may allow the production of ceramic inert anodes, for which the amount of metal phase is generally less than 10% by weight. However, the electrical conductivity of this type of anode and their mechanical properties turn out to be inadequate.

Moreover, it has also been proposed to use all-metal parts to manufacture such inert anodes.

For example, patent applications WO99/36591 and WO00/06803 describe such inert anodes which are all-metal. However, the corrosion resistance of these anodes in cryolite baths is inadequate.

Finally, it has been proposed to use composite materials with a ceramic matrix containing one or more metallic phases as electrode materials, so as to combine the respective advantages of the metallic phase and the ceramic phase. Such composite materials, which contain at least one ceramic phase and at least one metallic phase, are known by the name "cermet materials".

The metallic phases of these cermet materials can improve the mechanical properties of the electrodes and their conductivity, while the ceramic phases can improve their corrosion resistance in cryolite baths.

However, the lack of stability of the metallic and ceramic phases when such anodes made of cermet material remain for long periods of time in cryolite baths tends to limit their service life and cause contamination of the electrolyte and the aluminum.

Many patent applications concern this type of cermet anode material.

For example, mention may be made of the international application WO2004/082355 which discloses a method of making an inert cermet anode of type $NiO$—$NiFe_2O_4$-M comprising at least one nickel monoxide phase N, a spinel nickel phase S containing iron and nickel, and a metallic phase M containing copper and nickel, said method being characterized in that it comprises:
preparation of an initial mixture including at least one precursor of said monoxide N and spinel S phases, a precursor of the metallic phase M and an organic binder, the proportion of organic binder in the initial mixture being less than 2.0% by weight and the precursor of the metallic phase comprising a metallic powder containing copper and nickel,
forming the mixture, to form a green anode with a determined shape,
sintering the green anode at a temperature in excess of 900° C. in a controlled atmosphere containing at least one inert gas and oxygen.

This method, which improves manufacturing of the anode by reducing the amount of binder, does not entirely solve the anode stability problem in the cryolite bath. In particular it was found that the electrical conductivity of the spinel phase of nickel $NiFe_2O_4$ decreased during electrolysis, which conditioned the life time of the anode.

The international application WO2005/035813 describes an anode manufacturing method wherein a cermet containing one of the constituents of the oxide is a metal element which can be reduced in whole or in part during a reduction operation as part of the manufacturing process. This method which improves the manufacturing of the anode by reducing the exudation of metal does not entirely solve the problem of stability of the anode in the cryolite bath.

The international application WO01/31090 discloses a cermet inert anode comprising a ceramic phase represented by the formula $Ni_xFe_{2y}M_zO_{(3y+x+z)\pm\delta}$, where M represents at least one metal selected from Zn, Co, Al, Li, Cu, Ti, V, Cr, Zr, Nb, Ta, W, Mb, Hf and rare earths, preferably Zn and/or Co, x is between 0.1 and 0.99, y is from 0.0001 and 0.9, z is between 0.0001 and 0.5, and δ is between 0 and about 0.03. This inert cermet anode also contains a metal phase such as Cu, Ag, Pd, Pt, Au, Rh, Ru, Ir and/or Os. A life time compatible with industrial operating conditions has not been demonstrated for this type of anode.

It is therefore noted that electrode materials known from prior art are not fully satisfactory for making inert anodes for aluminum production that operate optimally (i.e. with low power consumption) and with an acceptable life time from an industrial point of view.

The present invention proposes to overcome the drawbacks detailed above that are a feature of electrode materials known from prior art. cl BRIEF SUMMARY The inventors of the present invention have quite surprisingly developed a new electrode material, in particular a new inert anode material with a view to using said inert anode in the production of aluminum, reconciling the following antagonistic parameters:

satisfactory conductivity in the usual temperature conditions of igneous electrolysis processes, in order not to increase the electrical power consumption related to this technology;

corrosion resistance in the cryolite baths usually used for this electrolysis, and which are aggressive;

suitable mechanical properties of the inert anode with a view to industrial handling;

a satisfactory life time of the inert anode from an industrial point of view (therefore essentially economic) and improved with respect to inert anodes known from prior art;

reduction in contamination of the aluminum produced by electrolysis, and the electrolysis bath based on molten cryolite.

DETAILED DESCRIPTION

The first subject of the invention is an electrode material, preferably an inert anode material, comprising at least a metal core and a cermet material, said metal core being at least covered by said cermet material and said cermet material forming an external layer of said electrode material which is designed to be in contact with an electrolysis bath, more particularly a cryolite bath, said electrode material being characterized in that:

said metal core comprises at least one nickel (Ni) and iron (Fe) alloy, the proportions by weight of Ni and Fe being as follows:

40%≤Ni≤85%, preferably 55%≤Ni 80%,

15%≤Fe 60%, preferably 20%≤Fe 45%, said cermet material comprises at least as percentages by weight:

45 to 80% of a nickel ferrite oxide phase of composition $Ni_xFe_yM_zO_4$ with 0.60≤x≤0.90; 1.90≤y≤2.40; 0.00≤z≤0.20 and M being a metal selected from aluminum (Al), cobalt (Co), chromium (Cr), manganese (Mn), titanium (Ti), zirconium (Zr), tin (Sn), vanadium (V), niobium (Nb), tantalum (Ta) and hafnium (Hf) or being a combination of these metals, 15 to 45% of a metallic phase comprising at least one alloy of nickel and copper.

The inventors of the present invention in fact found, quite surprisingly, that the composition of the electrode material described above is particularly suitable for the use of this material as an inert anode in cryolite baths during the production of aluminum by igneous electrolysis.

The electrode material according to the invention has the essential characteristics of having at least a metal core and an outer layer formed of a cermet material, said outer layer of cermet material being designed to be in contact with an electrolysis bath, more particularly a cryolite bath, namely when the inert anode manufactured from this electrode material is immersed in an electrolysis bath based on cryolite during electrolysis.

The various constituents of the electrode material according to the invention and their respective quantities were chosen optimally, so that the metal core and the cermet material exert synergistic effects between each other so that an inert anode is obtained from this electrode material that fully satisfies the above requirements of conductivity, corrosion resistance and strength expected of inert anodes used in producing aluminum, for example by igneous electrolysis.

In particular, it should be noted that when the electrode material according to the invention is used as an inert anode for the production of aluminum in a cryolite bath, said material has the remarkable and advantageous feature that its resistance to corrosion begins to work and is maintained during electrolysis.

The synergistic effects between the metal core and the cermet material are as described below.

In the electrode material according to the invention, the following interactions take place:

firstly, the metallic core:

acts as a reservoir that feeds the cermet material with iron and nickel, said cermet material having a tendency to become depleted in these elements, and protects the cermet material so that it does not undergo chemical or structural changes that would make it less conductive and less resistant to corrosion.

secondly, the cermet material acts as a chemical buffer which prevents electrode material from dissolving in a cryolite bath, while ensuring high electrical conductivity. The cermet material protects the metal core against corrosion induced by the presence of fluorine and oxygen in the cryolite bath. In other words, the cermet material prevents the anode from dissolving or passivating.

We describe below in more detail the many advantages provided by the constituents of the electrode material according to the invention, and the interactions between these components which produce synergistic effects suitable for industrial applications of this electrode material that include aluminum production.

First, because of the composition of the metal core detailed above, the metal core provides good electrical conductivity of the electrode material according to the invention.

Alloys based on Ni—Fe are known to be good alloys for use as an anode at high temperatures, for example at igneous electrolysis temperatures.

The percentage of iron by weight between 15% and 60% that comprises the metal core is particularly suitable for the metallic core to feed the cermet material with iron.

During electrolysis, the cermet material may lose iron if corrosion occurs on the surface of the anode. In the electrode material according to the invention, the iron loss of the cermet material is compensated for by the fact that the iron will move from the metal core to the cermet material, especially via cationic defects in the structures of the oxides that said cermet material contains (and because of oxidation phenomena). The iron of the metal core will then enter the nickel ferrite oxide phase of the cermet material and thereby maintain the composition of this phase, and therefore the corrosion resistance and electrical conductivity of this nickel ferrite oxide phase. In other words, because of this feeding, the iron of the metal core maintains the chemical "buffer zone" that constitutes the cermet material.

In this way, the iron of the metal core is essential for the regeneration of the cermet material.

Also, the lower limit of 15% and the upper limit of 60% of the weight percentage of iron in the metal core were chosen to avoid deterioration to:
the metal core during movement of the iron out of the metal core,
the cermet material during manufacture of the electrode material (i.e. preventing an excessive reaction of the redox type during the sintering phase of the manufacturing process) and/or during electrolysis, which could result in the composition of the cermet material no longer having the technical specifications detailed above.

If the iron moves out of the metal core too quickly, this can lead to inhomogeneities or areas devoid of iron in the Ni—Fe alloy of the metal core. The movement of iron occurs primarily at the grain boundaries of the metal core. This results in a loss of cohesion of the grains over long periods, thereby leaving zones highly depleted in iron.

Therefore, it is essential to properly regulate the flow of iron, to:
prevent too rapid a depletion of the metal iron core that might create these iron-depleted zones, thereby weakening the metal core and consequently the anode, and
regenerate the cermet material as electrolysis proceeds.

In this way, in addition to appropriate selection of the amount of iron in the metal core, it was also necessary to optimize the amount of nickel that it contains.

Nickel provides the Ni—Fe alloy with refractoriness (i.e. mechanically maintaining the temperature) and oxidation resistance. The resistance to oxidation of the metal core increases in proportion to the nickel content.

It was found that a percentage by weight of nickel of between 40% and 85% is particularly advantageous and perfectly in keeping with the above range of the percentage of iron by weight, to:
prevent the metal core of the electrode material according to the invention from becoming too depleted in iron over time, resulting in a significant nickel concentration at the surface of the metal core, and therefore the formation of NiO, or even $NiF_2$ in the presence of oxygen and fluorine. NiO and $NiF_2$ are poor conductors.
optimally regulate the flow of iron out of the metal core so as to feed the cermet material with this metal, in view of the fact that if there is not enough nickel, the iron is likely to leave the metal core too quickly. But, conversely, if there is too much nickel, the iron will not feed the cermet material sufficiently to regenerate the iron.

The metal core of the electrode metal material according to the invention has the advantage of locally maintaining a reducing potential which counteracts the oxidative potential of the cermet material on the cryolite bath side, said oxidizing potential being connected to the electrolysis reaction in the cryolite bath in which an inert anode made from the electrode material according to the invention is immersed.

The composition of the metal core was carefully chosen so that the deterioration of the metal core of the electrode material according to the invention is avoided by oxidation and/or fluorination.

In other words, if the electrode material did not include a metal core containing iron, internal oxidation would occur, which would allow fluorine to diffuse to the extent of altering the microstructure of said material, together with its electrical conductivity properties. The result of this, if the material is used as an inert anode, would be to destroy it completely during electrolysis.

In addition, the metal core provides the electrode material according to the invention with good mechanical stability (i.e. strength) that is adequate to handle it in the industrial applications for which it is intended.

In one embodiment of the invention, the metal core of the electrode material further includes copper (Cu) in the following proportions by weight: $5\% \leq Cu \leq 40\%$.

Preferably in this embodiment of the invention, the proportions by weight of the metal core are:
$40\% \leq Ni \leq 70\%$;
$20\% \leq Fe \leq 45\%$;
$7\% \leq Cu \leq 20\%$.

Copper is a more noble metal than nickel, so it will oxidize after nickel. The presence of copper in the composition of the metal core helps to maintain the aforementioned chemical buffer zone in the cermet material.

However, the amount of copper will be chosen appropriately and, to do this it must not exceed 40% in order to prevent too rapid a diffusion of copper outside the metal core and consequently out of the electrode material. The copper may react with the alumina dissolved in the cryolite bath so as to form copper aluminates which are highly soluble in this bath and which will therefore contaminate it.

In another embodiment of the invention, the metal core of the electrode material further comprises at least one metal A, said metal A being selected from chromium (Cr), cobalt (Co), manganese (Mn) and molybdenum (Mo), the proportion by weight of metal A in the metal core being as follows: $0.5\% \leq A \leq 30\%$.

Advantageously, when the metal core further comprises at least one metal A, the proportions by weight are as follows:
$40\% \leq Ni \leq 80\%$;
$15\% \leq Fe \leq 40\%$;
$0 \leq Cu \leq 20\%$;
$0.5\% \leq A \leq 15\%$.

Preferably, when metal A is Mo, the proportion by weight of Mo is: $0.5\% \leq Mo \leq 10\%$.

Preferably, when metal A is Cr or Mn, the proportion by weight of Cr or Mn is: $5\% \leq Cr$ or $Mn \leq 15\%$.

The presence of metal A in the composition of this metal core has the advantage of causing the formation of mixed oxide layers in said metal core that help regulate the movement of iron from the metal core towards the cermet material. However, as explained above, regulation of the flow of the iron in the electrode material according to the invention is an important factor for optimizing the use of the inert anode made from such a material.

If the amount of metal A in the metal core exceeds 30%, it may form soluble fluorides or oxyfluorides that could contaminate the cryolite bath. So the amount of metal A will be adjusted to avoid the formation of soluble fluorides and oxyfluorides.

In another embodiment of the invention, the metal core further comprises at least one metal M' selected from the same metals M listed above in the description of the composition of the nickel ferrite oxide phase of the cermet material, i.e. metal M' is selected from aluminum (Al), cobalt (Co), chromium (Cr), manganese (Mn), titanium (Ti), zirconium (Zr), tin (Sn), vanadium (V), niobium (Nb), tantalum (Ta) and hafnium (Hf) or a combination of these metals, the proportion by weight of metal M' in the metal core being as follows: $0.5\% \leq M' \leq 10\%$.

Advantageously, when the metal core further comprises at least one metal M', the proportions by weight are as follows:
$40\% \leq Ni \leq 80\%$;
$15\% \leq Fe \leq 40\%$;
$0 \leq Cu \leq 20\%$;
$0 \leq A \leq 20\%$;
$0.5\% \leq M' \leq 5\%$.

The presence of metal M' in the composition of this metal core has the advantage of supplying this metal M' to the nickel ferrite oxide phase which may lose part of the metals M such as described above which it includes in its composition during electrolysis. In other words, metal M' can move from the metal core towards the cermet material to compensate for losses in metal M of the nickel ferrite oxide phase. This regeneration during electrolysis of the nickel ferrite oxide phase improves the cermet material's resistance to oxidation at high temperature.

Advantageously, the metal core comprises at least one metal M' which is identical to metal M of the nickel ferrite oxide phase of the cermet material.

Quite advantageously, the metal or metals M' of the metal core are identical to the metal(s) M of the nickel ferrite oxide phase of the cermet material.

So in this embodiment, the presence of metal M' in the composition of this metal core has the advantage of replenishing with this metal the nickel ferrite oxide phase which may lose part of this metal which it includes in its composition during electrolysis. In other words, during electrolysis, the metal M' initially present in the composition of the metal core will be transported into the nickel ferrite oxide phase of the cermet material to compensate for losses of metal M that said nickel ferrite oxide phase contains. As explained above, regeneration during electrolysis of the nickel ferrite oxide phase improves the cermet material's resistance to oxidation at high temperature.

As with metal A, the amount of metal M' must be selected appropriately to avoid the risk of the formation of fluorides or oxyfluorides that are soluble in the cryolite bath. This is why, to avoid this problem of the formation of fluorides or oxyfluorides, the percentage by weight of metal M' must not exceed 10%.

In view of the respective lists of metals A and M' detailed above, it should be noted that cobalt (Co), chromium (Cr) and manganese (Mn) can belong to both metals A and metals M'.

Depending on how much of them there are in the metal core and depending on the initial composition of the nickel ferrite oxide phase of the cermet material, these metals Co, Cr and Mn may:
 be the cause of the formation of mixed oxide layers in the metal core, i.e., they may perform the function of metals A described above and/or:
 supply or replenish the nickel ferrite oxide phase with this metal M', i.e. they may perform the function of metals M' described above.

In one embodiment of the invention, the metal core may further comprise at least one rare earth element, preferably one rare earth element selected from yttrium (Y), cerium (Ce), lanthanum (La) and neodymium (Nd). Rare earth element may represent up to 5% of the mass of the metal core. More preferably, this weight ratio of rare earth element is less than or equal to 3%.

The rare earth elements present in the metal core of the electrode material according to the invention contribute to increasing the oxidation resistance of the Ni—Fe alloy.

The technical characteristics of the cermet material that the electrode material according to the invention contains are now given in fuller detail.

By selecting a composition for the cermet material as detailed above, said cermet material is particularly resistant to corrosion under polarization.

In addition, the cermet material protects the metal core and, because of this protection, it contributes to maintaining the electrical conductivity of the electrode material according to the invention. In the electrode material according to the invention, the electrical conductivity of the anode is largely due to the metal core that said electrode material contains.

Moreover, the composition of the cermet material as described above was carefully selected to avoid problems of degradation at the grain boundaries of this material and infiltration of the cryolite bath into the metal core, and also to maintain good electrical conductivity (i.e. greater than 80 Siemens (S)/cm).

Preferably, the thickness of the cermet material which forms the outer layer of the electrode material according to the invention (and with which at least the metal core is covered) is greater than or equal to 1 mm, and more preferably between 2 and 8 mm. Such thickness is advantageous for giving the cermet material the function of chemical buffer already mentioned above, i.e. a function of protecting the metal core combined with good resistance to corrosion as well as appropriate electrical conductivity during the service life of the inert anode.

So in the electrode material according to the invention, the cermet material is not a simple coating layer of the metal core but is an essential component of the electrode material and has a certain thickness in order to optimize its different functions.

Therefore, the cermet material is sufficiently thick so as to:
1) exhibit effective retention power: namely, firstly to preserve the iron in the electrode material, and secondly to prevent oxygen or fluorine present in the cryolite bath from degrading the metal core,
2) remain in the same state throughout use of the electrode material, for example for use as an inert anode during the manufacture of aluminum.

In other words, there should be a thickness of cermet material such that its slow (and inevitable) dissolution over time will not fundamentally change its properties detailed above, i.e. slowing down and limiting infiltration of the cryolite bath into the metal core.

Furthermore, the cermet material is also relatively fine so that it can be regenerated with iron evenly throughout its thickness so as to ensure optimal use of the inert anode made from the electrode material according to the invention, namely in the manufacture of aluminum.

The various constituents of the cermet material and their respective quantities were selected so that the cermet material and, consequently, the electrode material according to the invention may exhibit the advantages which are detailed below.

The oxide of non-stoichiometric nickel ferrite (i.e. the atomic ratio of iron to nickel greater than 2) is known to be one of the oxides which combines corrosion resistance in a cryolite bath and electrical conductivity, the latter being a function of said atomic ratio of iron to nickel ranging from 10 to 100 $S \cdot cm^{-1}$ at 960° C.

Therefore, the composition of the selected nickel ferrite oxide phase in the context of the invention which has been described above is a good compromise between electrical conductivity and resistance to corrosion.

The composition of the electrode material detailed above selected in this way is particularly suitable for preventing the composition of the nickel ferrite oxide phase from varying during use of the inert anode and tends towards the composition $NiFe_2O_4$ (i.e. a poorly conductive composition). During igneous electrolysis and at the surface of the inert anode, iron leaves the nickel ferrite oxide phase by oxidation of $Fe^{2+}$ ions into $Fe^{3+}$ and may give rise to the formation of $Fe_2O_3$ or iron aluminate or iron fluorides which dissolve in the cryolite bath. The movement of iron from the metal core to the cermet material aims to counter this loss of iron from the nickel ferrite oxide phase.

The nickel ferrite oxide phase of the cermet material has a spinel structure. Spinel structure is taken to mean a crystalline structure whose composition is of the AB2O4 type, where A is a cation in a tetrahedral site (surrounded by four oxygen molecules) and B are two cations in octahedral sites (surrounded by six oxygen molecules). This type of compact cubic structure is particularly advantageous in aggressive conditions such as a cryolite bath for the production of aluminum.

The iron in the nickel ferrite oxide phase ensures electrical conductivity of the nickel ferrite by electron hopping between $Fe^{2+}$ and $Fe^{3+}$ on the octahedral sites of the spinel structure.

In addition, in conditions of electrolysis, this nickel ferrite oxide phase within the cermet material selected gives rise to the formation of a nickel ferrite layer which is adhesive and coherent on the surface of the cermet material.

When the inert anode is immersed in a cryolite bath, the nickel ferrite oxide layer tends to dissolve slightly so that it forms on the surface of the cermet material an aluminate layer ($NiAl_2O_4$) which is very slightly soluble in the cryolite bath. The presence of this aluminate layer slows down the insertion of the oxygen and fluorine present in the cryolite bath into the cermet material and consequently reduces the oxidation rate of said cermet material, thereby helping to maintain the integrity of the electrode material according to the invention.

It should be noted that the nickel ferrite oxide composition as described above (i.e. $Ni_xFe_yM_zO_4$ with $0.60 \leq x \leq 0.90$; $1.90 \leq y \leq 2.40$; $0.00 \leq z \leq 0.20$) that the electrode material according to the invention includes is particularly suitable for the use of this material as an inert anode for igneous electrolysis.

During electrolysis, the composition of this nickel ferrite oxide phase will slightly vary within the cermet material depending on whether this is a part of said nickel ferrite oxide phase which is:

1) close to the cryolite bath (i.e. almost at the surface of the inert anode): x will then tend towards a value of 0.9; which is favorable for the corrosion resistance of the nickel ferrite oxide phase.
2) close to the metal core: x will then tend towards a value of 0.6; which is favorable for the conductivity of the nickel ferrite oxide phase.
3) in the core of the cermet material: the value x of the nickel ferrite oxide phase is between 0.7 and 0.8, which is particularly advantageous since it gives a good compromise between corrosion resistance and conductivity of the nickel ferrite oxide phase, and consequently of the cermet material.

The conductivity and the corrosion resistance of the nickel ferrite oxide phase change according to the stoichiometry of said nickel ferrite oxide phase, namely for values of x between 0.6 and 1:
conductivity decreases to close to zero when x equals 1, while, conversely, corrosion resistance tends to increase as x increases.

This is why it is essential to reach a chemical balance of the nickel ferrite oxide phase that gives a good compromise in which electrical conductivity and corrosion resistance are satisfactory. As explained above, the nickel ferrite oxide phase then acts as a chemical buffer.

The core of the cermet material is the active region of said cermet material, i.e. it requires local equilibration conditions for the cermet material that must restrain and condition the transport of materials detailed above.

Furthermore, the weight percentage of the nickel ferrite oxide phase in the cermet material of between 45 and 80% is particularly suitable for this phase to be percolating, i.e. it must completely surround the grains of the metallic phase of the cermet material. In this way, this nickel ferrite oxide phase helps to slow down oxidation of the metallic phase of the cermet material, and therefore of the electrode material according to the invention.

Preferably, the nickel ferrite oxide phase of the cermet material is between 60% and 80% of the mass of the cermet material.

Preferably, the nickel ferrite oxide phase of the cermet material has the composition $Ni_xFe_yM_zO_4$, with $0.70 \leq x \leq 0.85$; $2.00 \leq y \leq 2.20$; $0.00 \leq z \leq 0.10$.

The choice of metal M that the nickel ferrite oxide phase of the cermet material contains is now more fully described.

If metal M is aluminum or chromium, this has the advantage of reducing or slowing the dissolution of the nickel ferrite oxide phase in the cryolite bath. The amount of aluminum or chromium will be appropriately selected to ensure that the element does not introduce inhomogeneities in the composition of the oxides of the cermet material if the anode material is manufactured by powder metallurgy, in view the fact that this element diffuses little during sintering when the cermet material is being manufactured.

Other metals M considered, for example with valences 2+/3+ (such as Co or Mn) valency 4+ (such as Ti, Zr, Sn, V, Nb or Hf), or valency 5+ (such as Ta) have the advantage of increasing the electrical conductivity of the nickel ferrite oxide phase.

The metallic phase containing at least one Ni—Cu alloy that the cermet material contains takes part in:

the electrical conductivity of the "initial" cermet material (i.e. the cermet material as it is when the inert anode is first used), and maintaining the electrical conductivity of the cermet material, when it changes during electrolysis as explained above.

This metallic phase containing at least one Ni—Cu alloy is preferably finely distributed (i.e. with a particle size for this metallic phase of between about 10 µm and 50 µm on average) and homogeneously in the nickel ferrite oxide phase.

Obtaining such a fine and homogeneous distribution of the metallic phase comprising at least one Ni—Cu alloy in the nickel ferrite oxide phase is well within the capabilities of experts in the field who have mastered powder metallurgy.

In other words, this metallic phase containing at least one Ni—Cu alloy is advantageously surrounded by the nickel ferrite oxide phase, which, under polarization, prevents it from oxidizing quickly and leading to the formation of soluble species in the cryolite bath such as NiO which, in addition, is less conductive.

This fine, homogeneous distribution of Ni—Cu present in the nickel ferrite oxide phase therefore has the advantage of maintaining the reduction conditions that oppose the oxidizing conditions of the cryolite bath.

A percentage by weight of the metallic phase (said metallic phase comprising at least one Ni—Cu alloy) of the cermet material which is between 15% and 45% is particularly suitable for maintaining a reduction potential allowing durable coexistence of the different phases of the cermet material.

Preferably, said metallic phase containing at least one Ni—Cu alloy is between 25% and 35% of the mass of the cermet material.

Preferably, in the Ni—Cu alloy that at least the said metallic phase of the cermet material contains, the proportions by weight of Ni and Cu are as follows: 20%≤Ni≤90% and 10%≤Cu≤80%, and more preferably 50%≤Ni≤90% and 10%≤Cu≤50%.

The nickel of the Ni—Cu alloy of the metallic phase will oxidize first and protects the copper from this oxidation phase. Oxidation of this metallic phase containing at least one Ni—Cu alloy which is nickel-rich causes the formation of an NiO phase or insertion of nickel in the ferrite oxide phase of nickel, which fixes it locally, while conversely, if the copper oxidizes, it diffuses rapidly which it is of course necessary to avoid.

This justifies why in the metallic phase containing at least the Ni—Cu alloy of the cermet material, it is advantageous for the nickel to be in the majority, so that it oxidizes over long periods, consistent with the lifetime of an inert anode used in the manufacture of aluminum. In this way, it prevents oxidation of the copper in this Ni—Cu metallic phase, which would have the drawbacks detailed above.

It should be noted that nickel is only very slightly soluble in a cryolite bath rich in alumina. The nickel on the surface of the cermet material (and therefore on the surface of the electrode material of the invention) is combined with the alumina of the cryolite bath, thereby forming nickel aluminate $Ni_xFe_yAl_{3-x-y}O_4$ by precipitation, which is only very slightly soluble. The presence of this nickel aluminate phase formed in this way helps to restrict fluorine and oxygen from entering the electrode material.

So the copper (a noble element) in this Ni—Cu metallic phase will remain in the cermet material over long periods. This has the advantage of giving reduction conditions that maintain the composition of the nickel ferrite oxide phase, and therefore benefiting from the appropriate compromise between resistance to corrosion in the cryolite bath and electrical conductivity which was mentioned above and which must be met with for in order to optimize the use of an inert anode in aluminum manufacturing.

The percentage by weight of copper between 10% and 80%, and preferably between 10% and 50% in the Ni—Cu alloy of the metallic phase of the cermet material is particularly suitable for copper to be present throughout the electrolysis, but is also low enough to prevent exudation when the anode is prepared by powder metallurgy, in view of the fact that the sintering temperature likely to be used for making the inert anode is greater than the melting point of copper.

When balancing the cermet material phases during manufacture of the inert anode and/or electrolysis, the metal phase of the cermet material which contains at least one Ni—Cu alloy may further contain a small amount of iron, for example a percentage by weight of between 1% and 2% relative to the total mass of the metallic phase. No iron in metallic form should preferably be introduced initially, however, as an initial constituent used to manufacture the cermet material, to prevent it from oxidizing during the preparation of the electrode material and/or during electrolysis which would cause it to dissolve in the cryolite bath, thereby creating porosity in the electrode material.

In one embodiment of the invention, the metal phase of the cermet material further contains gold (Au) and/or silver (Ag); the percentage by weight of these metals Au and/or Ag does not exceed 5% of the mass of said metallic phase of the cermet material. Preferably, said percentage by weight of these metals Au and/or Ag represents between 2% and 3% of the mass of said metallic phase of the cermet material.

According to one embodiment of the invention, the cermet material further contains a monoxide phase of composition $Ni_{x'}Fe_{1-x'}O$ with 0.70≤x'≤1.00, and preferably with 0.75≤x'≤0.85 The percentage by weight of this monoxide phase with respect to the mass of the cermet material is preferably less than 10%.

So in the context of the present invention, if x' is equal to 1, said monoxide phase that the cermet material may optionally contain is NiO (i.e. nickel oxide).

This monoxide phase of the cermet material also, following the oxidation of the nickel ferrite, prevents formation of $Fe_2O_3$, which is highly soluble in the cryolite bath.

Furthermore, when the inert anode is prepared by powder metallurgy, when using NiO as a starting constituent in the composition of the cermet material during the preparation of the electrode material according to the invention, it will be advantageous to adjust the amount used so that this oxide phase, which, as will be remembered, is likely to be present in the cermet material, contributes to the densification of the electrode material.

In addition, this oxide phase as detailed above may contain iron which may originate, for example, from the ferrite used during sintering when manufacturing the cermet material. The presence of iron will result essentially from chemical interactions between the different phases of the cermet material of the electrode material according to the invention during its preparation.

It should be noted that nickel oxide (NiO) may form in the cermet material by internal oxidation during electrolysis when producing aluminum because of the fact that the cermet material comprises at least one nickel ferrite oxide phase and a metallic phase comprising at least one Ni—Cu alloy as described above. Nickel oxide is much less conductive (1-2 S·cm$^{-1}$ at 960° C.) than the nickel ferrite oxide phase, hence the need to limit the amount of this.

In other words, during electrolysis, the cermet material may contain NiO, even if this monoxide was not one of the starting constituents used for the manufacture of the cermet material (i.e. even if the NiO was not present in the initial composition of the cermet material of the electrode material according to the invention).

In one embodiment of the invention, the cermet material further contains at least one rare earth oxide phase. The rare earth oxide of this phase is advantageously chosen from $Y_2O_3$, $CeO_2$, $La_2O_3$ and $Nd_2O_3$. This phase of rare earth oxides can represent up to 5% of the mass of the cermet material. Preferably, the weight percentage of this phase of rare earth oxide(s) is less than or equal to 3% of the mass of cermet material.

The presence of a rare earth oxide phase in the composition of the cermet material helps to improve the quality of the grain boundaries. In addition, this rare earth oxide phase blocks the fluorine in the cryolite bath by forming fluorides and thereby prevents fluorine from being deeply inserted into the inert anode during electrolysis which would cause it to deteriorate.

The electrode material according to the present invention may also include one or more accommodation layers or "intermediate layers" that are arranged between the metal core and the cermet material.

In other words, in this embodiment of the invention, the core of the metallic electrode material is covered with intermediate layer(s) and a cermet material. And, as explained above, the cermet material forms the outer layer of the electrode material which is designed to be in contact with a cryolite bath, i.e. when the inert anode made from this electrode material is immersed in a cryolite bath during electrolysis.

It is advantageous for the electrode material according to the invention to include at least one intermediate layer between the metal core and the cermet material.

Preferably, the intermediate layer includes at least nickel and is predominantly metallic.

So in one embodiment of the invention, the electrode material further comprises at least one intermediate layer arranged between the metal core and the cermet material, said intermediate layer comprising at least nickel and being predominantly metallic.

The intermediate layer helps to accommodate the mechanical stresses due to differences in expansion coefficients of the metal core and the cermet material that the electrode material according to the invention contains.

In addition, the intermediate layer helps to maintain the composition of the nickel ferrite oxide phase of the cermet material described above. The intermediate layer will regulate the movement of iron from the metal core towards the cermet material, because of the fact that it contains nickel which limits the movement of the iron.

The thickness of the intermediate layer may be between one hundred microns and about a millimeter.

In one embodiment, the intermediate layer is a nickel layer having a thickness of between 200 and 300 microns which, for example, has been deposited by electrodeposition on the metal core of the electrode material according to the invention.

According to another variant of the invention, said intermediate layer is a layer of cermet material (i.e. a material which comprises at least one ceramic phase and at least one metal phase) which contains by volume more than 50% of a metallic phase containing at least nickel. For example, this metal phase is an Ni—Cu alloy.

The intermediate layer may act jointly with the cermet material in its function of providing a "buffer zone" detailed above. This is why, advantageously, when the electrode material according to the invention comprises at least one intermediate layer, the total thickness of the cermet material and the intermediate layer is greater than or equal to 1 mm, said cermet material having a thickness of at least 0.5 mm.

The compositions of the different phases of the electrode material can be calculated using thermodynamic software and verified experimentally via measurements using a Castaing microprobe or by EDX (Energy Dispersive X-ray spectrometry) on SEM photographs (SEM being the abbreviation for "Sweeping Electron Microscopy").

The invention also relates to a method of manufacturing the electrode material according to the invention which has been described above.

The manufacturing process of the electrode material described above comprises at least the following steps:
The metal core of the electrode material is prepared as described above, for example, by a method selected from casting, molding (preferably investment casting or sand casting), or a hot working technique such as rolling, extrusion or by powder metallurgy.
Optionally, at least one intermediate layer is deposited on the metal core as described above.
Cermet material such as described above is deposited on the metal core, where appropriate on the last intermediate layer deposited,
said cermet material may be deposited by a method selected from:
  spray methods, for example:
    plasma spraying,
    supersonic flame spraying (HVOF, acronym for "High Velocity Oxy-Fuel"),
    high-pressure supersonic flame projection (HPVOF, acronym for "High Pressure High Velocity Oxi-Fuel"),
    supersonic air spraying (HVAF acronym for "High Velocity Air Fuel")
    detonation gun spraying,
    cold spraying,
  or powder metallurgy methods.

"Powder metallurgy method" means a process which comprises a series of steps of uniaxial or isostatic pressing (cold or hot) of a mixture of powders that are followed by heat treatment (sintering) under a controlled atmosphere.

The deposition of the intermediate layer may be performed by any deposition technique well within the capabilities of those skilled in the art. For example, mention may be made of dipping, prilling, painting, brushing, spraying (including all the thermal spray techniques that have been detailed above for depositing the cermet material), electrodeposition, chemical vapor deposition and physical vapor deposition. This list of techniques for the deposition of the intermediate layer is in no way limiting. Any equivalent technique perfectly within the capabilities of those skilled in the art may be considered.

Advantageously, before the depositing the cermet material, or optionally a first intermediate layer, pretreatment is carried out (for example shot blasting or sandblasting) on the surface of the metal core so as to eliminate any impurities, for example those deriving from the casting process and increase the adherence of the coming deposit (i.e. the deposit of cermet material or a first intermediate layer).

In one conceivable embodiment of the invention, the metal core, any intermediate layers and the cermet material are made by co-sintering or by additive fabrication.

Laser processes (e.g. laser welding and laser sintering) can also be used to produce the electrode material according to the invention.

The method of manufacturing the electrode material will of course be adapted according to the use to which said material is to be put, for example if it is used as an anode in an inert cryolite bath during the production of aluminum.

In particular, the choice of shape, dimensions and composition of the metal core and the cermet material and its possible intermediate layers will be made depending on the use for which the electrode material according the invention is intended.

The preparation of the metal core, and the technique used to deposit the intermediate layers and the cermet material are well within the capabilities of those skilled in the art as they make use of techniques well known to them.

In addition, it should be noted that the various techniques mentioned above as to the preparation of the metal core and the deposit of any intermediate layers and the cermet material can be used separately or in combination.

It is important that after manufacturing the electrode material according to the invention the outer surface of said electrode material is uniformly covered with a dense (i.e. one which preferably has a porosity less than or equal to 5%) and adhesive layer of cermet material as described above.

The invention also relates to an inert anode made from the electrode material according to the invention which has been described above.

The inert anode made from the electrode material according to the invention is particularly suitable for use in the manufacture of aluminum, for example by igneous electrolysis.

Specifically, the inert anode according to the invention is designed to withstand the cryolite baths conventionally used in the field of aluminum production, i.e. cryolite baths which may have current densities between about 0.5 and about 1.2 A/cm², in a temperature range of between about 880° C. and 980° C.

Inert anodes have excellent conductivity (greater than 80 S/cm) and are particularly resistant to corrosion in cryolite baths as detailed above.

The inert anode according to the invention has the advantage of having a life time of more than 10,000 hours. This is particularly advantageous from an industrial standpoint for both economic and maintenance reasons.

It should be noted that the inert anode according to the invention has a longer life time than inert anodes made exclusively of cermet material.

The present invention also relates to an electrolytic cell which comprises at least one inert anode as described above.

The present invention also relates to a method of producing aluminum by electrolysis in an electrolytic cell as described above.

EXPERIMENTAL PART

Examples of electrode materials, firstly for purposes of comparison with respect to the invention and secondly according to the invention and their use as inert anodes during electrolysis are described below.

For all the experiments described below, the electrolysis conditions were as follows: a cryolite bath with a cryolitic ratio of 2, the cryolitic ratio being the ratio of mole percentages of NaF over $AlF_3$, with $Al_2O_3$ to saturation point and 5% of $CaF_2$ at a temperature of 960° C. and with a current of 0.8 A/cm².

I—COMPARATIVE EXAMPLES

Example A

1$^{st}$ Comparative Example of an Anode

An anode in the form of a cylinder 20 mm in diameter and formed from a cermet material composed of a nickel ferrite oxide phase $Ni_{0.9}Fe_{2.3}O_4$, in other words pure nickel ferrite, was manufactured.

This anode was subjected to electrolysis for 96 hours under the conditions described above.

At the end of the electrolysis, it was found that the anode had been deformed and had a general shape similar to that of a "diabolo" indicating that the working area of the anode had been the interface between the cryolite bath and the gas atmosphere.

This deformation of the anode can be explained by the fact that pure nickel ferrite oxide oxidizes rapidly and becomes less conductive than the cryolite bath.

So from this example A it is noted that pure nickel ferrite oxide is not a suitable material for the manufacture of an inert anode to be used for igneous electrolysis in the production of aluminum.

Example B

2$^{nd}$ Comparative Example of an Anode

An anode formed only from a cermet material containing, as percentages by weight:
  67% of a nickel ferrite oxide phase, of composition: $Ni_{0.77}Fe_{2.19}Al_{0.04}O_4$;
  2% of an NiO phase;
  2% of $Y_2O_3$;
  29% of a metal phase of a Ni—Cu alloy comprising, as percentages by weight, 85% nickel and 15% copper.
  was tested for 360 hours in electrolysis conditions as detailed above.

It should be noted that in this example B, the cermet material of this anode corresponds to a cermet material as described above, namely a cermet material that the electrode material according to the invention may contain.

After 360 hours, scanning electron microscopy revealed that the anode then had a highly porous microstructure.

In addition, at the surface of the anode, the metallic phase had completely disappeared over a thickness of 2.9 mm.

Only the nickel ferrite oxide phases and nickel oxide were present at the surface of the anode and were distributed in the form of a superposition of layers parallel to each other extending toward the surface of the anode.

The oxide layer of nickel ferrite nearest the surface of the anode had the following composition: $NiFe_2O_4$, namely a non-conductive composition.

After a certain time, the anode of this example B was no longer sufficiently conductive. The anode did not have any means to regenerate iron from the nickel ferrite oxide phase which disappeared gradually as the electrolysis proceeded.

This example B therefore shows that an anode which contains only a cermet material as described above is not satisfactory for use in electrolysis for the production of aluminum.

II—EXAMPLES ACCORDING TO THE INVENTION

For all electrode materials in examples 1-5 of the invention which follow, the manufacturing process was as follows:

The manufacture of the cermet material that the electrode material according to the invention contains was conducted as follows:

1) First a nickel ferrite oxide of composition $Ni_xFe_{3-x}O_4$ with a slight excess of NiO was prepared by performing the following steps:
   a mixture was prepared which included 65.8% of $Fe_2O_3$ powder and 34.2% of NiO powder;
   then the mixture so obtained was subjected to heat treatment for 5 hours in air at 1150° C. so as to obtain nickel ferrite oxide powder.
2) Next, in order to obtain a cermet material in powder form, this nickel ferrite oxide powder as obtained in step 1) above was mixed with powders of nickel, copper, alumina and optionally yttria (with compositions detailed in the examples below), and 1 to 5% of organic binder was added to the mixture.

Then, to manufacture the inert anode, the following steps were performed:
The cermet material powder so obtained was pressed onto a metal core composition (said metal core composition is described in each of the inventive examples below);
This was sintered (by heat treatment) in a controlled atmosphere to a maximum temperature of between 1100° C. and about 1350° C.

After sintering, the inert cermet anode material contained the following phases:
a nickel ferrite oxide phase of composition $Ni_{0.75}Fe_{2.20}Al_{0.05}O_4$,
a monoxide phase of composition $Ni_{0.85}Fe_{0.15}O$,
a metallic phase of Ni—Cu alloy comprising a mixture, in weight percentages, of 85% Ni and 15% Cu,
where appropriate, one to two yttria phases (depending on the compositions—see in examples according to the invention below).

Example 1

1st Example of an Anode According to the Invention

An inert anode was manufactured from an electrode material according to the present invention, which contained:
a metal core containing a mixture of nickel, iron and molybdenum in the following proportions by weight: 80% nickel, 15% iron and 5% molybdenum;
a cermet material with a thickness of 8 mm, said cermet material containing, as percentages by weight:
   67% of a nickel ferrite oxide phase of composition $Ni_{0.75}Fe_{2.20}Al_{0.05}O_4$;
   1.5% of a monoxide phase of composition $Ni_{0.85}Fe_{0.15}O$;
   31% of a metal phase of a Ni—Cu alloy comprising, as percentages by weight, 85% nickel and 15% copper.
   and 0.5% of a $Y_2O_3$ phase.

It should be noted that this cermet material corresponds to a cermet material of the same type as that of the anode in comparative example B, comparable from the point of view of its physicochemical properties.

After 96 hours of electrolysis in the conditions as detailed above, no wear damage on the anode of this example 1 was detected.

A layer of pure nickel ferrite oxide is to be found on the surface of the anode.

Under this layer, the three phases of the cermet material (i.e. a nickel ferrite oxide phase, a monoxide phase and a metallic phase) are still present.

The results from example 1 are different from the results obtained with the anode of example B (an anode which, for the record, included only a cermet material of the same type).

So this example 1 demonstrates the effectiveness of the electrode material according to the invention. From the electrode material according to the invention an inert anode is obtained that is perfectly suitable for use in igneous electrolysis for the production of aluminum.

In addition, in view of the different results obtained between example B and example 1, this Example 1 demonstrates the advantage that the electrode material includes not only a cermet material but also a metal core.

Example 2

2nd Example of an Anode According to the Invention

An inert anode with outside diameter 34.4 mm was manufactured from an electrode material according to the present invention. Said electrode material contained:
a metal core containing a mixture of nickel, iron and copper in the following proportions by weight: 65% nickel, 25% iron and 10% copper;
a cermet material covering the side wall of the metal core by a thickness of 7 mm and the bottom wall of the metal core by a thickness of 16 mm.
Said cermet material contained as percentages by weight:
   66% an nickel ferrite oxide phase of composition: $Ni_{0.75}Fe_{2.20}Al_{0.05}O_4$;
   1.5% a monoxide phase of composition $Ni_{0.85}Fe_{0.15}O$;
   31% a metal phase of a Ni—Cu alloy comprising, as percentages by weight, 85% nickel and 15% copper.
   and 1.5% of a $Y_2O_3$ phase.

Similarly to example 1, it should be noted that this cermet material corresponds to a cermet material of the same type as that of the anode in comparative example B.

The anode of example 2 was subjected to electrolysis for a period of 96 hours in the electrolysis conditions as described above.

The anode of example 2 showed a steady potential during the 96 hours of testing.

Furthermore, after 96 hours of electrolysis, it was found that the anode was intact. It was also observed that the three phases of the cermet material (i.e. a nickel ferrite oxide phase, a monoxide phase and a metallic phase) were still present.

The results from example 2 are different from the results obtained with the anode of example B (an anode which, for the record, included only a cermet material of the same type).

So this example 2 demonstrates the effectiveness of the electrode material according to the invention. From the electrode material according to the invention an inert anode is obtained that is perfectly suitable for use in igneous electrolysis for the production of aluminum.

In addition, in view of the different results obtained between example B and example 2, this Example 2 demonstrates the advantage that the electrode material includes not only a cermet material but also a metal core.

In other words, this example 2 demonstrates the beneficial interactions between the metal core and the cermet material in the electrode material according to the invention.

Example 3

3rd Example of an Anode According to the Invention

A 3rd anode according to the present invention was manufactured to the same composition as that of example 2 and therefore very similar to it.

Specifically, the anode of example 3 differed from that of example 2 only by some differences in the dimensions, namely:
- the thickness of the cermet material on the side wall of the metal core was 8 mm;
- the thickness of the cermet material on the bottom wall of the metal core was 1.2 mm;
- the outer diameter of the anode was 34.4 mm.

After 96 hours of electrolysis, the cermet material was still present on the anode. Moreover, there was no evidence of wear damage to the anode.

The three initial phases of the cermet material (i.e. the nickel ferrite oxide phases, monoxide and metal) were still present.

A thin layer of nickel ferrite oxide of composition $Ni_{0.9}Fe_{2.1}O_4$ very close to the composition of pure nickel ferrite oxide, was formed on the surface of the anode, and the cermet material under this thin layer was composed as follows:
- nickel ferrite oxide phase of composition $Ni_{0.82}Fe_{2.12}Al_{0.05}O_4$,
- monoxide phase of composition $Ni_{0.8}Fe_{0.2}O$.

The metallic phase of the cermet material still contained nickel and copper.

Figure 1:
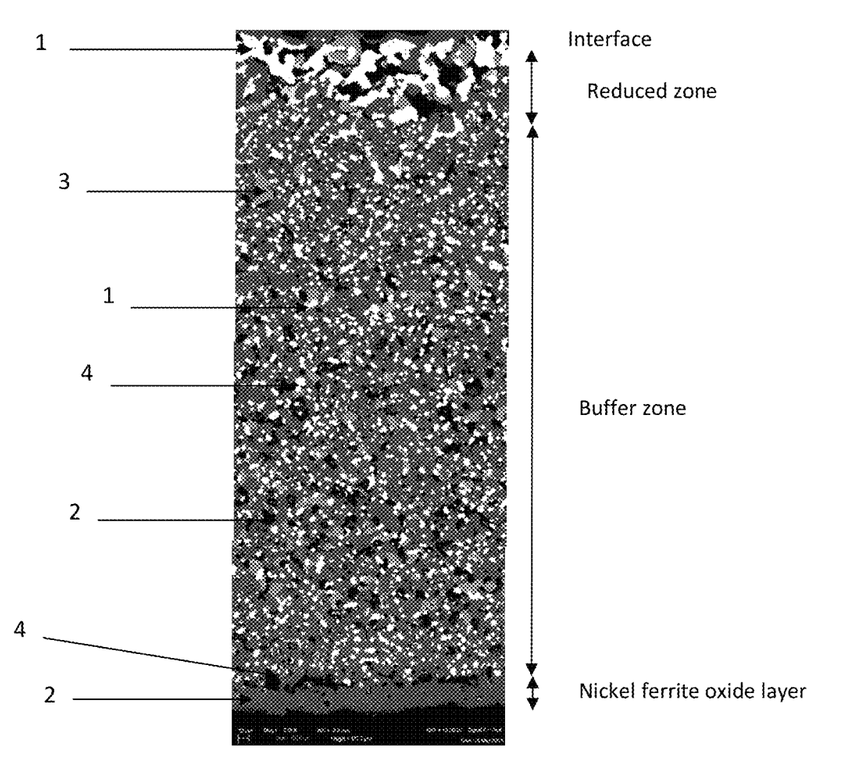
FIG. 1 is a photograph of an observation by backscattered electron SEM of a portion of the inert anode of example 3 according to the invention.

As regards the inert anode of this example 3 according to the invention, FIG. 1 is a photograph of an observation by backscattered electron SEM of a portion of this inert anode taken after 96 hours of electrolysis and after having been resin-coated, cut and polished. More specifically, the part photographed is the cermet material that this anode includes.

The characteristics of this observation by SEM were: micrograph showing an area of 460 microns by 1.2 millimeters, at the level of the bottom wall of the anode.

The photograph in FIG. 1 shows the different phases of the cermet material present, which are:
- phase 1, metallic, of Ni—Cu alloy (white dots),
- phase 2 of nickel ferrite oxide $Ni_xFe_yAl_zO_4$ (dark gray dots),
- phase 3, monoxide $Ni_xFe_{1-x}O$ (light gray dots),
- and porosities 4 (black dots).

In addition, in FIG. 1 the various limitations are indicated:
- "interface": The interface between the cermet material and the metal core of the inert anode;
- "reduced zone": The area of material located between the cermet material and the metal core of the inert anode;
- "buffer zone": The chemical buffer zone of the cermet material, i.e. the core of the cermet material;
- "nickel ferrite oxide layer": The outer side of the cermet material, namely the layer of the cermet material which was in contact with the cryolite bath during electrolysis.

It can be seen that the part of the cermet material that was in contact with the cryolite bath during electrolysis has been transformed into a fine nickel ferrite oxide layer of forty microns or so dense (dark gray color of the dots in FIG. 1).

The part of the cermet material in contact with the metal core of the inert anode has a significant proportion of metal (white dots in FIG. 1), demonstrating the reduction of the cermet material by the metal core during electrolysis.

Finally, given the importance of the "buffer zone" in FIG. 1, it is noted that the majority of the cermet material was only slightly transformed: despite the presence of pores, the three phases present are still visible and therefore still present after 96 hours of electrolysis.

Example 4

4rd Example of an Anode According to the Invention

An inert anode with outside diameter 24.2 mm was manufactured from an electrode material according to the invention. Said electrode material contained:
- a metal core containing a mixture of nickel, iron and copper in the following proportions by weight: 65% nickel, 25% iron and 10% copper;
- a cermet material with a thickness of 2 mm.

Said cermet material contained as percentages by weight:
- 67% of a nickel ferrite oxide phase, of composition: $Ni_{0.75}Fe_{2.20}Al_{0.05}O_4$;
- 1% of a monoxide phase of composition $Ni_{0.85}Fe_{0.15}O$;
- 32% of a metal phase of a Ni—Cu alloy comprising, as percentages by weight, 85% nickel and 15% copper.

After 213 hours of electrolysis under the conditions as described above, the anode according to Example 4 was intact.

Example 5

5th Example of an Anode According to the Invention

A 5th anode according to the present invention was manufactured to the same composition as that of example 4 and therefore very similar to it.

Specifically, the anode of example 5 differed from that of example 4 only by some differences in the dimensions, namely:
- the outer diameter of the anode was 34 mm.
- the thickness of the cermet material was 8 mm.

After 404 hours of electrolysis under conditions which have been detailed above, it can be seen that the anode has undergone only minor wear damage.

In addition, the cermet material is still present on the anode and contains three phases (i.e., nickel ferrite oxide phase, a monoxide phase and a metal phase)

The results from example 5 are different from the results obtained with the anode of example B (an anode which, for the record, included only a cermet material of the same type).

So this example 5 demonstrates the effectiveness of the electrode material according to the invention. From the electrode material according to the invention an inert anode is obtained that is perfectly suitable for use in igneous electrolysis for the production of aluminum.

In addition, in view of the different results obtained between example B and example 5, this Example 5 demonstrates the advantage that the electrode material includes not only a cermet material but also a metal core.

The invention claimed is:

1. Electrode material comprising at least a metal core and a cermet material, said metal core being at least covered by said cermet material and said cermet material forming an external layer of said electrode material which is designed to be in contact with an electrolysis bath, characterized in that:
   said metal core contains a mixture of nickel (Ni), iron (Fe), and copper (Cu), with proportions by weight of Ni, Fe, and Cu being as follows:
   $63\% \leq Ni \leq 67\%$,
   $23\% \leq Fe \leq 27\%$, and
   $8\% \leq Cu \leq 12\%$, and
   said cermet material comprises at least as percentages by weight:
   65 to 69% of a nickel ferrite oxide phase of composition $Ni_xFe_yM_zO_4$ with $0.70 \leq x \leq 0.85$; $2.00 \leq y \leq 2.20$; $0.00 \leq z \leq 0.10$ and M being a metal selected from aluminum (Al), cobalt (Co), chromium (Cr), manganese (Mn), titanium (Ti), zirconium (Zr), tin (Sn), vanadium (V), niobium (Nb), tantalum (Ta) and hafnium (Hf) or being a combination of these metals,
   30 to 34% of a metallic phase comprising at least one alloy of nickel and copper with 85% of Ni and 15% of Cu; and
   1 to 2% of a monoxide phase of composition $Ni_{x'}Fe_{1-x'}O$ with $x'=0.85$.

2. Electrode material according to claim 1, characterized in that the proportions by weight of the metal core are: 65% of Ni, 25% of Fe and 10% of Cu.

3. Electrode material according to claim 1, characterized in that the metal core of the electrode material further comprises at least one metal A, said metal A being selected from chromium (Cr), manganese (Mn), cobalt (Co) and molybdenum (Mo), with a proportion by weight of metal A in the metal core being as follows: $0.5\% \leq A \leq 30\%$.

4. Electrode material according to claim 3, wherein the proportion by weight of metal A in the metal core is $0.5\% \leq A \leq 15\%$.

5. Electrode material according to claim 1, characterized in that the metal core further comprises at least one metal M' selected from aluminum (Al), cobalt (Co), chromium (Cr), manganese (Mn), titanium (Ti), zirconium (Zr), tin (Sn), vanadium (V), niobium (Nb), tantalum (Ta) and hafnium (Hf) or a combination of these metals, with a proportion by weight of metal M' in the metal core being as follows: $0.5\% \leq M' \leq 10\%$.

6. Electrode material according to claim 5, wherein the metal core of the electrode material further comprises at least one metal A, said metal A being selected from chromium (Cr), manganese (Mn), cobalt (Co) and molybdenum (Mo), and the proportions by weight of the metal core are:
   $0 \leq A \leq 20\%$; and
   $0.5\% \leq M' \leq 5\%$.

7. Electrode material according to claim 1, characterized in that the metal core further comprises at least one rare earth element selected from yttrium (Y), cerium (Ce), lanthanum (La) and neodymium (Nd).

8. Electrode material according to claim 7, characterized in that the at least one rare earth element counts for up to 5% of a mass of the metal core.

9. Electrode material according to claim 1, characterized in that the cermet material further comprises at least one rare earth oxide phase.

10. Electrode material according to claim 9, characterized in that the rare earth oxide is selected from $Y_2O_3$, $CeO_2$, $La_2O_3$ and $Nd_2O_3$.

11. Electrode material according to claim 9, characterized in that the rare earth oxide phase is at most 5% of the weight of the cermet material.

12. Electrode material according to claim 1, characterized in that the metallic phase of the cermet material further comprises gold (Au) and/or silver (Ag), the percentage by weight of these metals Au and / or Ag not exceeding 5% of the weight of said metallic phase of the cermet material.

13. Electrode material according to claim 1, characterized in that a thickness of the cermet material is greater than or equal to 1 mm.

14. Electrode material according to claim 13, characterized in that the thickness of the cermet material is between 2 and 8 mm.

15. Electrode material according to claim 1, characterized in that the electrode material further comprises at least one intermediate layer arranged between the metal core and the cermet material, said intermediate layer containing at least nickel and being predominantly metallic.

16. Electrode material according to claim 15, characterized in that a total thickness of the cermet material and the intermediate layer is greater than or equal to 1mm, said cermet material having a thickness of at least 0.5 mm.

17. Electrode material according to claim 15, characterized in that the intermediate layer is a layer of nickel having a thickness of between 200 and 300 microns.

18. Electrode material according to claim 15, characterized in that the intermediate layer is a layer of cermet material comprising more than 50% by volume of a metallic phase containing at least nickel.

19. Method of manufacturing an electrode material according to claim 1, characterized in that the method comprises:
   preparing the metal core of said electrode material according to a method selected from casting, molding, rolling, hot working, extrusion, or powder metallurgy; and
   optionally depositing at least one intermediate layer is the metal core;
   depositing the cermet material on the metal core, or on a last deposited layer of the at least one intermediate layer, said deposition being carried out by a method selected from spraying or powder metallurgy.

20. Inert anode made from an electrode material according to claim 1.

21. Electrolysis cell comprising at least one inert anode according to claim 20.

22. A method comprising producing aluminum by electrolysis in an electrolysis cell according to claim 21.

23. Electrode material according to claim 1, characterized in that the cermet material is formed on the metal core by sintering.

24. Electrode material according to claim 23, characterized in that the metal core is formed by casting prior to sintering the cermet material.

25. Electrode material according to claim 1, characterized in that in that the cermet material further comprises 1.5% of $Y_2O_3$.

* * * * *